(12) United States Patent
Forman

(10) Patent No.: US 8,825,570 B2
(45) Date of Patent: Sep. 2, 2014

(54) ACTIVE LEARNING WITH PER-CASE SYMMETRICAL IMPORTANCE SCORES

(75) Inventor: George Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 246 days.

(21) Appl. No.: 13/563,645

(22) Filed: Jul. 31, 2012

(65) Prior Publication Data

US 2014/0040169 A1    Feb. 6, 2014

(51) Int. Cl.
G06F 17/00 (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | |
|---|---|---|---|
| 7,558,764 B2 * | 7/2009 | Abe et al. .................... | 706/14 |
| 7,596,431 B1 * | 9/2009 | Forman et al. ............... | 700/299 |
| 7,792,353 B2 * | 9/2010 | Forman et al. ............... | 382/159 |
| 8,180,715 B2 * | 5/2012 | Forman ....................... | 706/12 |
| 8,208,726 B2 * | 6/2012 | Eshghi et al. ................ | 382/177 |
| 8,266,179 B2 * | 9/2012 | Forman et al. ............... | 707/791 |
| 8,275,721 B2 * | 9/2012 | Abe et al. .................... | 706/12 |
| 8,311,957 B2 * | 11/2012 | Kirshenbaum et al. ....... | 706/12 |
| 8,352,396 B2 * | 1/2013 | Forman et al. ............... | 706/45 |
| 8,355,997 B2 * | 1/2013 | Kirshenbaum et al. ....... | 706/12 |
| 8,463,041 B2 * | 6/2013 | Eshghi et al. ................ | 382/180 |
| 8,627,403 B1 * | 1/2014 | Kirshenbaum et al. ....... | 726/1 |
| 8,719,201 B2 * | 5/2014 | Forman et al. ............... | 706/45 |
| 2010/0042561 A1 | 2/2010 | Abe et al. | |

OTHER PUBLICATIONS

Fan, W. et al, "Adacost Misclassification Cost-Sensitive Boosting", 1999.
Kapoor, A. et al, "Interactive Optimization for Steering Machine Classification", Apr. 10-15, 2010.
Pazzani, M. et al, "Reducing Misclassification costs", 1994.

* cited by examiner

Primary Examiner — Michael B Holmes

(57) ABSTRACT

A method for classifying cases includes receiving a pool of unlabeled cases with associated per-case symmetrical importance scores, applying a selection algorithm with a classifier to a training set and the pool, but without the per-case symmetrical importance scores, to determine selection scores for the unlabeled case, and combining the selection scores and the corresponding per-case symmetrical importance scores to form combined scores for the unlabeled cases. The method further includes providing a high scoring unlabeled case to an oracle to label, receiving a labeled case back from the oracle and augmenting the training set with the labeled case, training the classifier with the augmented training set, and applying the classifier to an additional unlabeled case.

15 Claims, 4 Drawing Sheets

ACTIVE LEARNING WITH PER-CASE SYMMETRICAL IMPORTANCE SCORES

BACKGROUND

Often one is given a large collection of cases that need to be classified but no labeled training set is initially available and the value of classifying different cases varies in importance. For some cases, it is very important to label them correctly; for others, it is less important.

BRIEF DESCRIPTION OF THE DRAWINGS

In the drawings.

Use of the same reference numbers in different figures indicates similar or identical elements.

DETAILED DESCRIPTION

Figure 1:
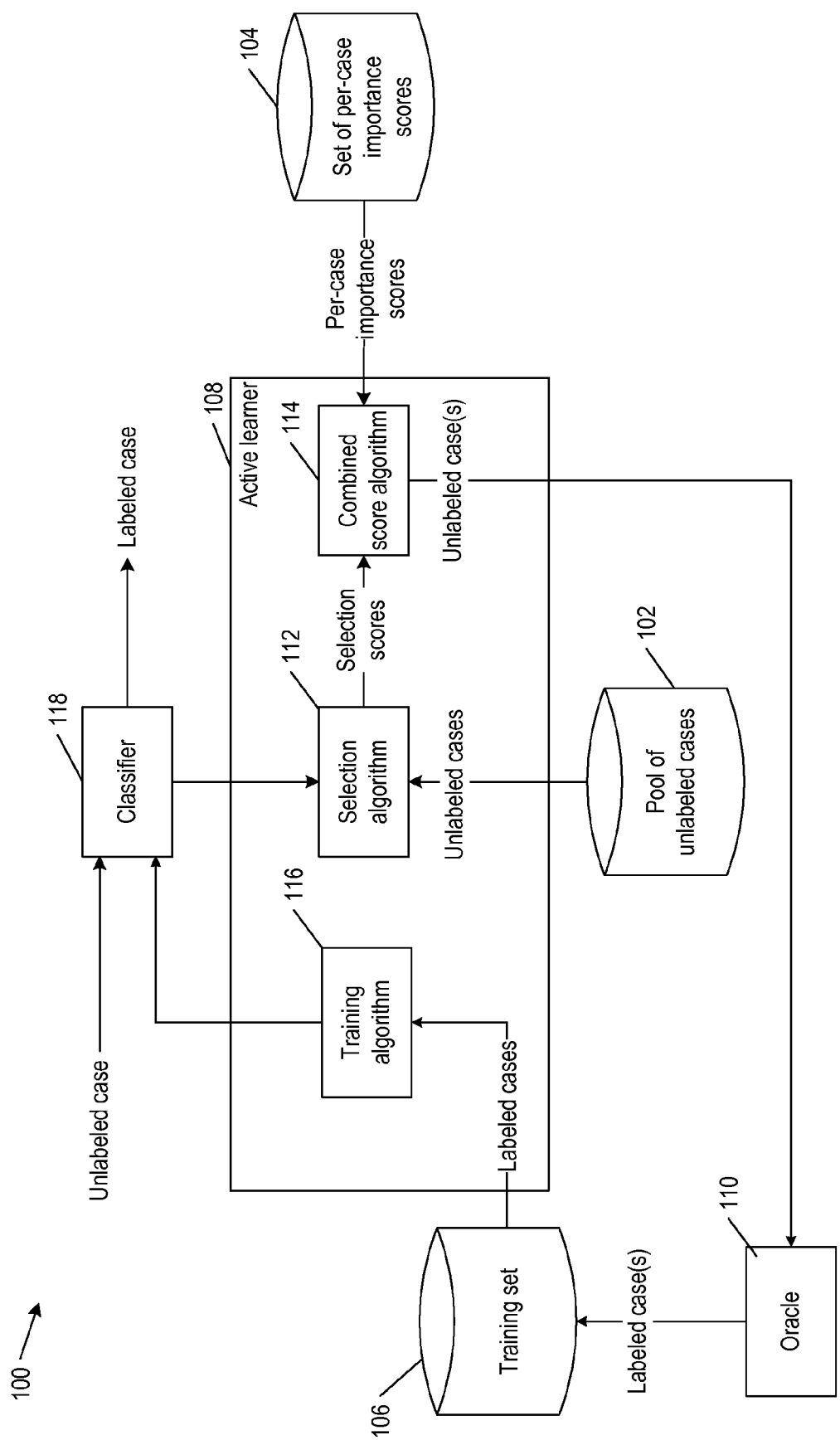
FIG. 1 is a block diagram of an active learning system in one example of the present disclosure.

In one example of the present disclosure, a transductive active learning system has a pool of unlabeled cases and a set of per-case symmetrical importance scores. Unlike existing active learning that focuses on classifying "future" cases that are not available at training time, the pool of unlabeled cases for the transductive active learning system is or can substantially include the entire pool of cases to be classified. Each unlabeled case has an associated per-case symmetrical importance score. The per-case symmetrical importance score indicates the importance of correctly classifying the unlabeled case. The per-case symmetrical importance score is different from an asymmetric misclassification cost, which has different costs for a false-alarm (false-positive) and a missed detection (false-negative), and is used to bias a classifier's decision threshold toward one or another class label. The per-case symmetrical importance score is a known number that is roughly proportional to the penalty if one were to label the case incorrectly (regardless whether a false-positive or false-negative). The per-case symmetrical importance score may reflect its popularity or actual monetary cost associated with the unlabeled case. However, the per-case symmetrical importance score is unrelated to class labels. Additionally, it may have a skewed distribution, with some cases having much higher importance than most of the others. In one example for classifying websites, network traffic to each website may be used as the per-case symmetrical importance score. In another example for classifying repairs, the monetary cost for each repair may be used as the per-case symmetrical importance score.

An oracle, such as one or more persons (domain experts) or one or more machines (algorithms), is available to determine the correct label for a given unlabeled case. In one example, the oracle may be clients paid to manually label the unlabeled cases so as to reveal their personal preferences. The active learning system aims to label all the unlabeled cases correctly without querying the oracle for every unlabeled case.

In one example, the active learning system applies a selection algorithm with a classifier to a training set and the pool of unlabeled cases to determine selection scores for the unlabeled cases. Each unlabeled case has an associated selection score. The selection algorithm is an active learning algorithm that does not consider the per-case symmetrical importance scores when determining the selection scores. The active learning system then combines the selections scores and the corresponding per-case symmetrical importance scores to determine combined scores for the unlabeled cases. Each unlabeled case has an associated combined score.

The combined score may be calculated in many ways. The active learning system may take as is, take a square root, take a logarithm, add a constant, or apply thresholding to the per-case symmetrical importance score. The active learning system may take as is, transform, subtract from a constant, invert, add a constant, or apply thresholding to the selection score. The active learning system may multiply the per-case symmetrical importance score and the selection score, add the per-case symmetrical importance score and the selection score, raise the per-case symmetrical importance score to an exponent of the selection score, or raise the selection score to an exponent of the per-case symmetrical importance score.

The active learning system provides the high (e.g., the top) scoring unlabeled case or cases to the oracle. The oracle labels the high scoring unlabeled case or cases, and the active learning systems augments the training set with the labeled cases and trains the classifier with the augmented training set. The operation continues iteratively, having the oracle label more and more unlabeled cases until one or more stop criteria are met. The stop criteria include running out of time, a domain expert getting tired, running out of budget to pay a domain expert, or the classifier achieving a desired accuracy. The accuracy of the classifier may be determined with cross-validation on the training set or a separate labeled dataset.

If initially the training set is empty or contains a small number of labeled samples, the active learning system may ignore the selection scores or does not even call the subsystem that generates the selection scores so the combined scores depend entirely on the per-case symmetrical importance scores. During this early phase before the training set is built up, the active learning system focuses the oracle on dealing with unlabeled cases that are more important to get right in the classification process.

Once enough cases have been labeled by the oracle so that a "viable" training set is available, the active learning system may switch to a different scoring strategy where both the selection score and the per-case symmetrical importance score are considered. In one example, a viable training set has at least one example case labeled for each class. In another example, the classifier may have greater requirements for the training set that require the active learning system to remain in the initial phase until the classifier does not throw an exception or is able to train properly.

FIG. 1 is a block diagram of a transductive active learning system 100 in one example of the present disclosure. Active learning system 100 has a pool 102 of unlabeled cases, a set of 104 of per-case symmetrical importance scores, and a training set 106. Each unlabeled case in pool 102 has an associated per-case symmetrical importance score in set 104. Initially training set 106 may be empty or contain a small number of labeled cases.

Active learning system 100 includes a transductive active learner 108 that selects the next unlabeled case or cases to be labeled by an oracle 110. Active learner 108 includes a selection algorithm 112, a combined score algorithm 114, and a training algorithm 116.

Selection algorithm 112 uses a classifier 118 to determine selection scores for the pool 102 of unlabeled cases. Alternatively selection algorithm 112 includes classifier 118 and training algorithm 116. For each unlabeled case, selection algorithm 112 outputs a selection score. In one example, the selection scores are normalized between 0.0 and 1.0. Examples of selection algorithm 112 include Random, Uncertainty, Query-By-Committee, and ActiveDecorate. Examples of classifier 118 include L2-regularized logistic regression (LR) binary linear classifiers, Naive Bayes classifier, and Support Vector Machine classifier.

Combined score algorithm 114 combines the selection scores and the corresponding per-case symmetrical importance scores for the unlabeled cases, and outputs combined scores for the unlabeled cases. Each unlabeled case has an associated combined score. Combined score algorithm 114 may combine the selection scores and the per-case symmetrical importance scores in a first manner when initially training set 106 is empty or contains a small number of labeled cases, and later in a second manner when training set 106 becomes viable.

Combined score algorithm 114 provides the high (e.g., top) scoring unlabeled case or cases to oracle 110. Oracle 110 labels the high scoring unlabeled case or cases, which are used to augment training set 106.

Trainer algorithm 116 trains classifier 118 with the augmented training set 106.

The described process may be repeated until one or more stop criteria are met.

Figure 2:
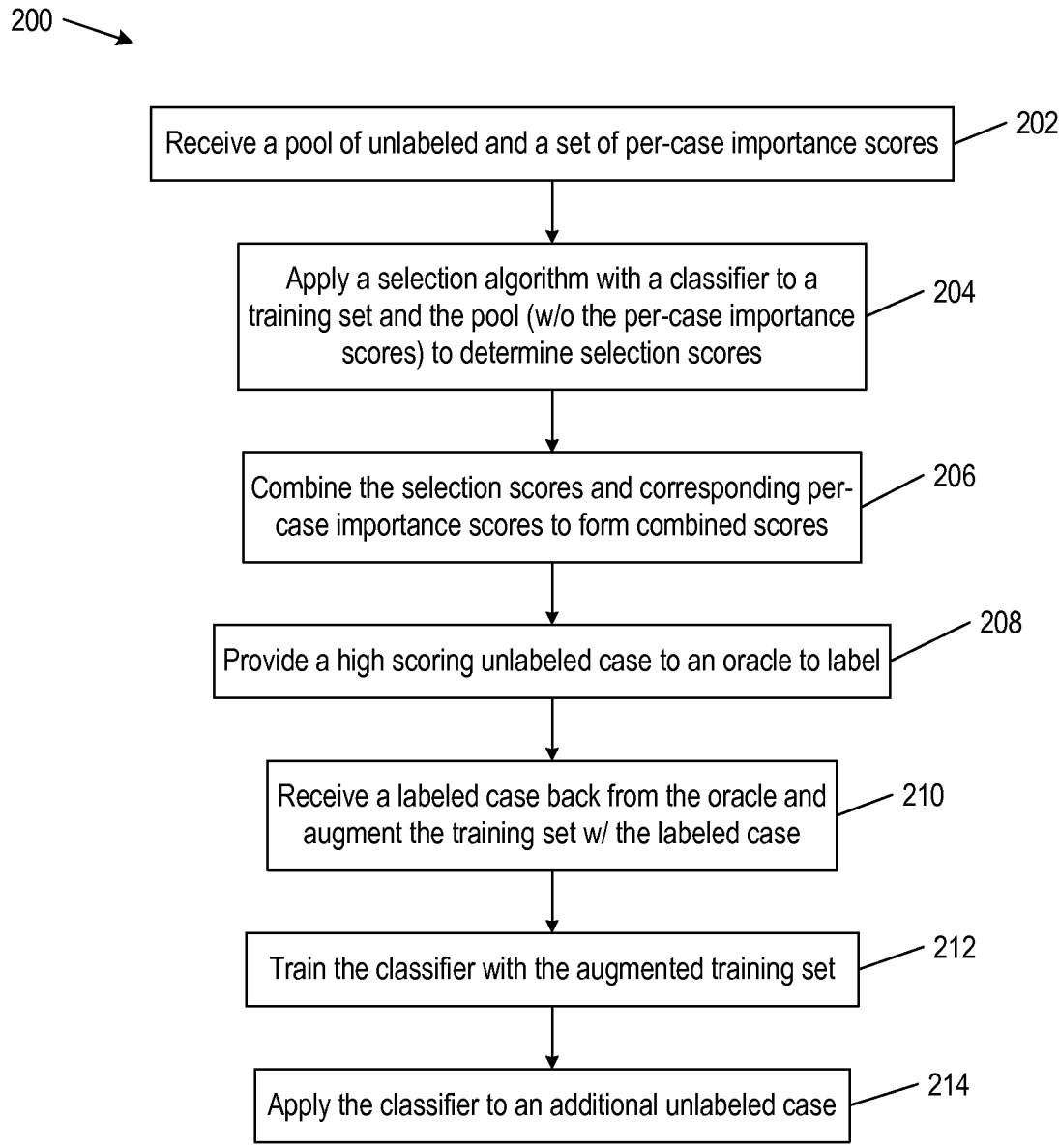
FIG. 2 is a flowchart of a method for a processor of a computer to implement an active learner of FIG. 1 in one example of the present disclosure.

FIG. 2 is a flowchart of a method 200 for a processor of a computer to implement transductive active learner 108 (FIG. 1) in one example of the present disclosure. Method 200 may begin in block 202.

In block 202, the processor receives pool 102 (FIG. 1) of unlabeled cases and set 104 of per-case symmetrical importance scores. Each unlabeled case has an associated per-case symmetrical importance score. Block 202 may be followed by block 204.

In block 204, the processor applies selection algorithm 112 (FIG. 1) with classifier 118 (FIG. 1) to the labeled cases in training set 106 (FIG. 1) and the unlabeled cases in pool 102 (FIG. 1). Selection algorithm 112 does not use the per-case symmetrical importance scores in set 104 (FIG. 1). Selection algorithm 112 outputs selection scores for the unlabeled cases. Each unlabeled case has an associated score. Block 204 may be followed by block 206.

In block 206, the processor combines the selection scores and their corresponding per-case symmetrical importance scores to form combined scores for the unlabeled cases. Each unlabeled case has an associated combined score. Block 206 may be followed by block 208.

In block 208, the processor provides high (e.g., top) scoring unlabeled case or cases to oracle 110 (FIG. 1) to label. Block 208 may be followed by block 210.

In block 210, the processor receives the labeled case or cases back from oracle 110 and augments training set 106 with them. Block 210 may be followed by block 212.

In block 212, the processor trains classifier 118 with the augmented training set 106. Block 212 may be followed by block 214.

In block 214, the processor applies classifier 118 to an additional unlabeled case.

Figure 3:
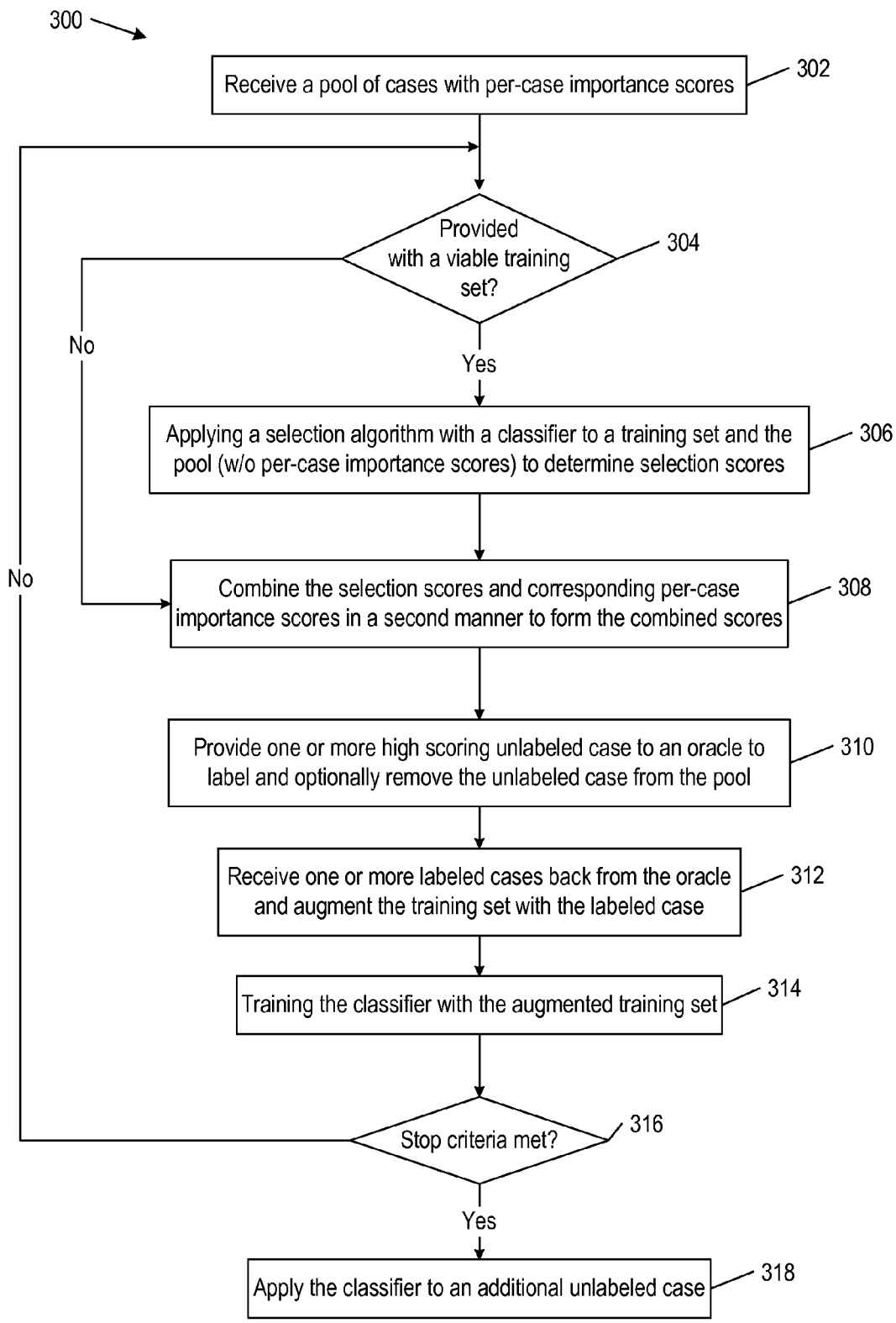
FIG. 3 is a flowchart of a method for a processor of a computer to implement the active learner of FIG. 1 in another example of the present disclosure.

FIG. 3 is a flowchart of a method 300 for a processor on a computer to implement transductive active learner 108 (FIG. 1) in another example of the present disclosure. Method 300 is a variation of method 200 (FIG. 2). Method 300 may begin in block 302.

In block 302, the processor receives pool 102 (FIG. 1) of unlabeled cases and set 104 (FIG. 1) of per-case symmetrical importance scores. Each unlabeled case has an associated per-case symmetrical importance score. Block 302 may be followed by block 304.

In block 304, the processor determines if training set 106 (FIG. 1) is viable. In one example, training set 106 is viable for classifier 118 when it has at least one case labeled for each class. Alternatively classifier 118 may have more stringent requirements for training set 106. When training set 106 is viable, block 304 may be followed by block 306. Otherwise block 304 may be followed by block 308.

In block 306, the processor applies selection algorithm 112 (FIG. 1) with classifier 118 (FIG. 1) to the labeled cases in training set 106 and the unlabeled cases in pool 102. Selection algorithm 112 does not use the per-case symmetrical importance scores in set 104. Selection algorithm 112 outputs selection scores for the unlabeled cases. Each unlabeled case has an associated selection score. Block 304 may be followed by block 306.

In block 308, the processor combines the selection scores and their corresponding per-case symmetrical importance scores in a second manner to form combined scores. When training set 106 is initially not viable, the processor ignores the selection scores as they are not available so the combined scores depends only on the per-case importance score.

In one example, the processor combines the selection scores and the per-case symmetrical importance scores as follows:

$$w*(1-m),$$

where w is a per-case symmetrical importance score for a case and m is a margin of the classifier's output for the case. Alternatively, the combined score may be formed in other manners described above. Block 308 may be followed by block 310.

In block 310, the processor provides the high (e.g., the top) scoring unlabeled case or cases to oracle 110 (FIG. 1) to label. When oracle 110 is one or more persons, the processor may display the high scoring unlabeled case or cases and provide a user interface for the person or persons to label them. The processor optionally removes the high scoring unlabeled case or cases from pool 102. Block 310 may be followed by block 312.

In block 312, the processor receives labeled case or cases back from oracle 110 and augments training set 106 with them. Block 312 may be followed by block 314.

In block 314, the processor trains classifier 118 with all the labeled cases in the augmented training set 106. Block 314 may be followed by block 316.

In block 316, the processor determines if one or more stop criteria have been met. If not, block 316 may be followed by block 304. Otherwise block 316 may be followed by block 318. The stop criteria include running out of time, a domain expert getting tired, running out of budget to pay a domain expert, or classifier 118 achieving a desired accuracy. The accuracy of classifier 118 may be determined with cross-validation on training set 106 or a separate labeled dataset.

In block 318, the processor applies classifier 118 to an additional unlabeled case. In one example, the additional unlabeled case. The additional unlabeled case may be from pool 102 or elsewhere.

In an alternative example, when training set 106 is initially not viable, a clustering algorithm may be used to provide the selection scores as the clustering algorithm does not require a training set as input. Thus, even when training set 106 is not viable, the combined score may still be a combination of the selection score and the per-case importance score.

Figure 4:
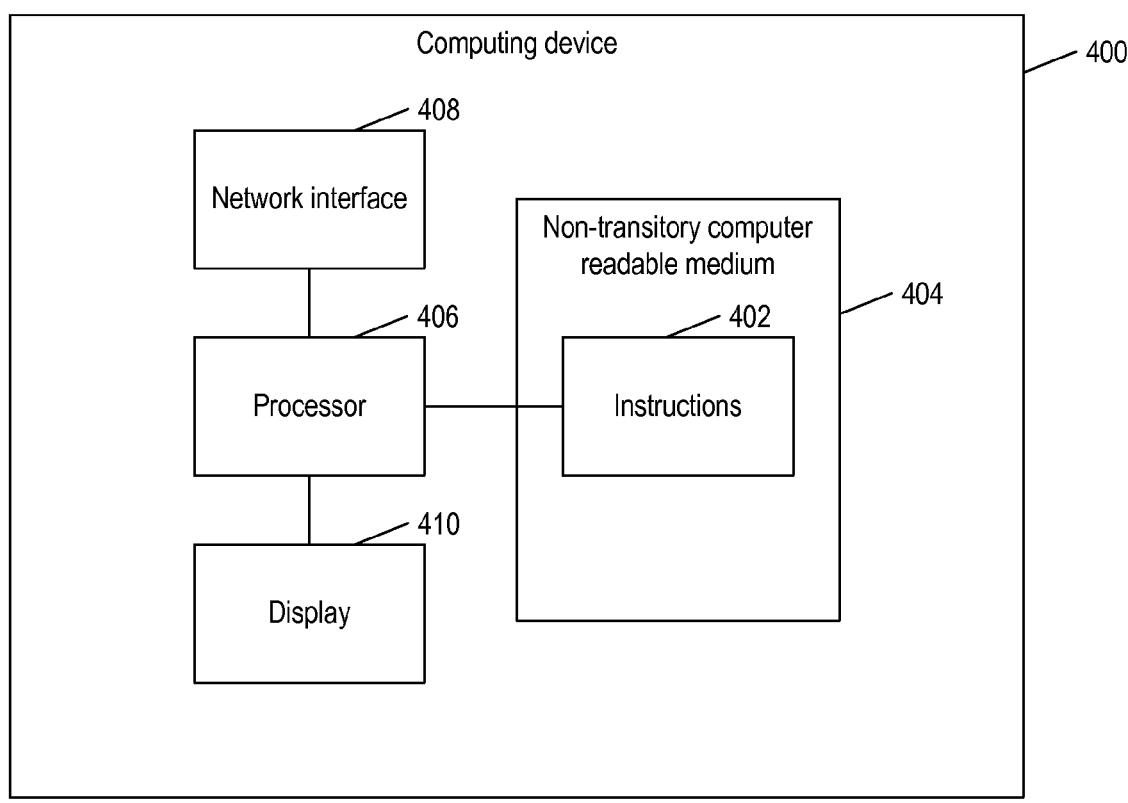
FIG. 4 is a block diagram of a computing device for implementing the active learner of FIG. 1 in one example of the present disclosure.

FIG. 4 is a block diagram of a computing device 400 for implementing transductive active learner 108 (FIG. 1) in one example of the present disclosure. Active learner 108 (FIG. 1) is implemented with processor executable instructions 402 stored in a non-transitory computer medium 404, such as hard disk drive, a solid state drive, or another nonvolatile computer memory. A processor 406 executes instructions 402 to provide the described features and functionalities, which may be implemented by sending instructions to a network interface 408 or a display 410.

Various other adaptations and combinations of features of the examples disclosed are within the scope of the invention. Numerous examples are encompassed by the following claims.

What is claimed is:

1. A method for classifying cases, comprising:
   receiving a pool of unlabeled cases;
   receiving a set of per-case symmetrical importance scores, each unlabeled case having an associated per-case symmetrical importance score;
   applying a selection algorithm with a classifier to a training set and the pool, without the per-case symmetrical importance scores, to determine selection scores, each unlabeled case having an associated selection score;
   combining the selection scores and the corresponding per-case symmetrical importance scores to form combined scores, each unlabeled case having an associated combined score;
   providing a high scoring unlabeled case to an oracle to label;
   receiving a labeled case back from the oracle and augmenting the training set with the labeled case;
   training the classifier with the augmented training set; and
   applying the classifier to an additional unlabeled case.

2. The method of claim 1, further comprising removing the unlabeled case from the pool.

3. The method of claim 1, wherein the training set is initially empty or has a small number of labeled cases, and the processor ignores the selection scores when combining the selection scores and the corresponding per-case symmetrical importance scores until the training set is viable.

4. The method of claim 3, further comprising, after training the classifier and prior to applying the classifier to the additional unlabeled case, repeating at least once:
   applying the selection algorithm with the classifier to the augmented training set and the pool, without the per-case symmetrical importance scores, to determine new selection scores;
   combining the new selection scores and the corresponding per-case symmetrical importance scores to form new combined scores, each unlabeled case having an associated new combined score;
   providing another high scoring unlabeled case to the oracle to label;
   receiving another labeled case back from the oracle and further augmenting the augmented training set with the other labeled case; and
   retraining the classifier with the further augmented training set.

5. The method of claim 4, wherein, after the augmented training set has at least one case labeled for each class, the classifier outputs a combined score comprising:

$$w*(1-m),$$

where w is a per-case symmetrical importance score for a case and m is a margin of the classifier's output for the case.

6. The method of claim 1, wherein a combined score comprises:
   taking as is, taking a square root, taking a logarithm, adding a constant, or applying thresholding to a per-case symmetrical importance score;
   taking as is, transforming, subtracting from a constant, inverting, adding a constant, or applying thresholding to an selection score; and
   multiplying the per-case symmetrical importance score and the selection score, adding the per-case symmetrical importance score and the selection score, raising the per-case symmetrical importance score to an exponent of the selection score, or raising the selection score to an exponent of the per-case symmetrical importance score.

7. The method of claim 1, wherein the oracle is a person or a machine.

8. A non-transitory computer readable medium encoded with executable instructions for execution by a processor to:
   receive a pool of unlabeled cases;
   receive per-case symmetrical importance scores, each unlabeled case having an associated per-case symmetrical importance score;
   apply a selection algorithm with a classifier to a training set and the pool, without the per-case symmetrical importance scores, to determine selection scores, each unlabeled case having an associated selection score;
   combine the selection scores and the corresponding per-case symmetrical importance scores to form combined scores, each unlabeled case having an associated combined score;
   provide a high scoring unlabeled case to an oracle to label;
   receive a labeled case back from the oracle and augment the training set with the labeled case;
   train the classifier with the augmented training set; and
   apply the classifier to an additional unlabeled case.

9. The medium of claim 8, further comprising removing the unlabeled case from the pool.

10. The medium of claim 8, wherein the training set is initially empty or has a small number of labeled cases, and the processor ignores the selection scores when combining the selection scores and the corresponding per-case symmetrical importance scores until the training set is viable.

11. The medium of claim 10, further comprising, after train the classifier and prior to apply the classifier to the additional unlabeled case, repeat at least once:
   apply the selection algorithm with the classifier to the augmented training set and the pool, without the per-case symmetrical importance scores, to determine new selection scores;
   combine the new selection scores and the corresponding per-case symmetrical importance scores to form new combined scores, each unlabeled case having an associated new combined score;
   provide another high scoring unlabeled case to the oracle to label;
   receive another labeled case back from the oracle and further augment the augmented training set with the other labeled case; and
   retrain the classifier with the further augmented training set.

12. The medium of claim 11, wherein, after the augmented training set has at least one case labeled for each class, the classifier outputs a combined score comprising:

$$w*(1-m),$$

where w is a per-case symmetrical importance score for a case and m is a margin of the classifier's output for the case.

13. The medium of claim 8, wherein a combined score comprises:
   taking as is, taking a square root, taking a logarithm, adding a constant, or applying thresholding to a per-case symmetrical importance score;
   taking as is, transforming, subtracting from a constant, inverting, adding a constant, or applying thresholding to an selection score; and
   multiplying the per-case symmetrical importance score and the selection score, adding the per-case symmetrical importance score and the selection score, raising the per-case symmetrical importance score to an exponent of the selection score, or raising the selection score to an exponent of the per-case symmetrical importance score.

14. The medium of claim 8, wherein the oracle is a person or a machine.

15. An apparatus, comprising:
   a memory;
   a processor to:
   receive a pool of unlabeled cases;
   receive per-case symmetrical importance scores, each unlabeled case having an associated per-case symmetrical importance score;
   apply a selection algorithm with a classifier to a training set and the pool, without the per-case symmetrical importance scores, to determine selection scores, each unlabeled case having an associated selection score;
   combine the selection scores and the corresponding per-case symmetrical importance scores to form combined scores, each unlabeled case having an associated combined score;
   provide a high scoring unlabeled case to an oracle to label;
   receive a labeled case back from the oracle and augment the training set with the labeled case;
   train the classifier with the augmented training set; and
   apply the classifier to an additional unlabeled case.

* * * * *